May 3, 1927.

C. LECRENIER

MOTOR

Filed Sept. 15, 1926   2 Sheets-Sheet 2

1,627,100

Inventor
C. Lecrenier
By Lacey & Lacey, Attorneys

Patented May 3, 1927.

1,627,100

UNITED STATES PATENT OFFICE.

CÉLESTIN LECRENIER, OF TAMPA, FLORIDA.

MOTOR.

Application filed September 15, 1926. Serial No. 135,603.

This invention is an apparatus for utilizing the force of water for the application or storage of energy, and one object of the invention is to provide a simple apparatus which may be advantageously employed wherever there is a natural fall of water. Another object of the invention is to provide a hydraulic motor of such construction that a relatively large volume of power may be developed from a relatively small flow or fall of water, and another object of the invention is to provide an apparatus which will operate automatically as long as the flow of water is continued. Other objects of the invention will appear incidentally in the course of the following description, and the invention resides in certain novel features which will be particularly defined in the appended claims.

In the accompanying drawings:

Fig. 4 is a detail perspective view of the reversing lever.

Figure 1:
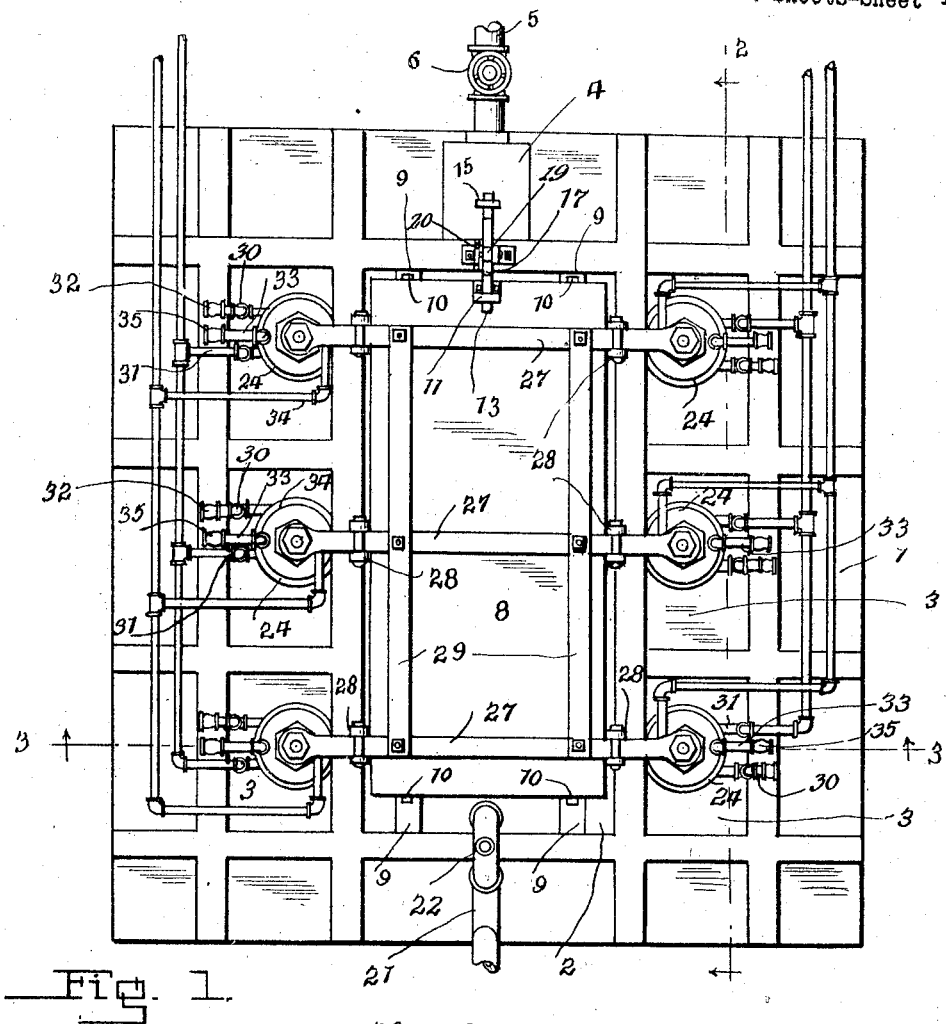
Figure 1 is a plan view of a motor constructed in accordance with the present invention.

In carrying out my invention, I employ a caisson or housing structure 1 of concrete which may be built up according to any method now generally practiced or hereafter approved. The caisson or foundation or housing is so arranged as to provide a large central working chamber 2 and a plurality of auxiliary chambers 3 arranged along the sides of the said working chamber. At one end of the caisson is arranged a tank or reservoir 4 into which the water is led from the source of supply through a pipe 5 which is equipped with a cut-off valve 6 of any approved form so that the flow of the water may be regulated or cut off entirely when desired. From the reservoir or receiving tank 4, an outlet pipe 7 extends to the bottom of the working chamber 2 so that the water will be delivered at the bottom of the chamber to act upon a plunger 8 mounted therein. The plunger 8 may be constructed of any suitable material and its horizontal area is slightly less than the area of the working chamber 2 so that the plunger may move up and down within the chamber without damaging contact with the walls of the same. Upon the end walls of the working chamber 2 at any convenient or preferred intervals are provided vertical ways or guides 9 slidably receiving projections 10 upon the plunger so that the plunger will be held to a vertical rectilinear path in its operation. Secured upon the plunger and rising from one end thereof is a post 11 which is vertically slotted, as indicated at 12, and may be braced in any convenient manner if desired. This post rises to a point above the top of the caisson and its upper closed end spans one end of a lever 13 which is fulcrumed between its ends upon a bracket 14 secured upon the caisson adjacent the tank 4, as will be understood. The outer end of the lever 13 plays within a bail or slotted post 15 carrying a ball valve 16 at its lower end, which valve is arranged to seat upon the upper end of the supply pipe 7 and cut-off the flow thereto at intervals in the operation of the apparatus. The bracket 14 projects above the fulcrum of the lever 13 and in the upper end of said bracket is fulcrumed a latch or rocking arm 17 which extends to both sides of the bracket and has its ends down turned, as shown at 18, and adapted to bear upon the lever 13. Extending upwardly from this latch and arranged at a right angle to the length of the latch is a central arm 19 carrying a weight 20 at its upper end.

Figure 2:
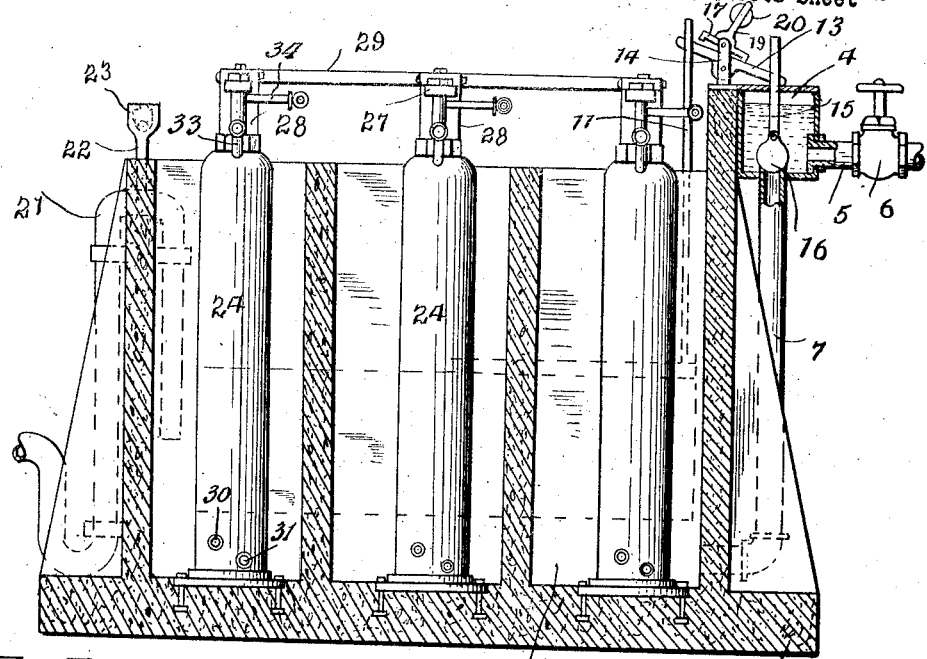
Fig. 2 is a vertical section on the line 2—2 of Fig. 1.

It will be understood that the force of the water entering the chamber 2 elevates the plunger 8 and the post 11, of course, moves upwardly with the plunger. As the plunger reaches the top of the working chamber 2, the top of the plunger will impinge against the adjacent overhanging end of the lever 13 and will rock the lever to the position illustrated in Figs. 2 and 4. The bail 15 and valve 16 will, consequently, then be unsupported and will drop by gravity onto the valve seat at the upper end of the pipe 7 so that the further flow of water into the working chamber will be cut off. The weight of the plunger then, of course, causes it to drop and eventually the upper closed end of the post 11 will impinge against the adjacent end of the lever 13 and reverse the position of the parts, the lever engaging the top of the bail 15 and lifting the valve as it swings to the position opposite that illustrated. When the lever 13 is rocked to the position illustrated in Figs. 2 and 4, the end of the latch 17 which is then in contact with the lever will, of course, be moved upwardly so that the latch will also be rocked about its pivot and the weight 20 will be carried to the opposite side of the pivot and will, consequently, act to maintain the latch in the position illustrated with its outer end in contact with the outer end portion of the lever 13. The valve 16 will, consequently, be permitted to remain seated until the plunger 8 has completed its down stroke and the lever 13 reversed in the manner described. Likewise after the lever has been reversed, the valve will be held unseated until the upstroke of the plunger has been completed.

To provide for the discharge of water from the caisson after the plunger has been raised, a siphon exhaust 21 is arranged at the end of the working chamber opposite the supply pipe 7. This siphon is in the form of an inverted U-shaped conduit with one end in communication wtih the lower portion of the working chamber 2 and its opposite end connected with an outflow pipe or carried off to any other point of discharge. In the top of the siphon or the upper bend of the U-shaped conduit is provided a vent for any air which may be trapped therein, the said vent including a short pipe 22 extending from the bend above the caisson and equipped with an outwardly opening valve 23. The level of water in the receiving branch of the siphon will, of course, be at least as high as the level of the water in the working chamber 2. The suction produced in the siphon will carry therefrom all the water in the discharging side thereof, the entrance of air at the top of the siphon being prevented by the valve 23. Should any air be trapped in the siphon when the plunger starts to descend, the pressure exerted upon the water by the weight of the plunger will increase the pressure upon any possible trapped air so that the valve 23 will be unseated and such air permitted to escape so that the siphon will operate very efficiently to effect discharge of the water and aid the descent of the plunger.

Figure 3:
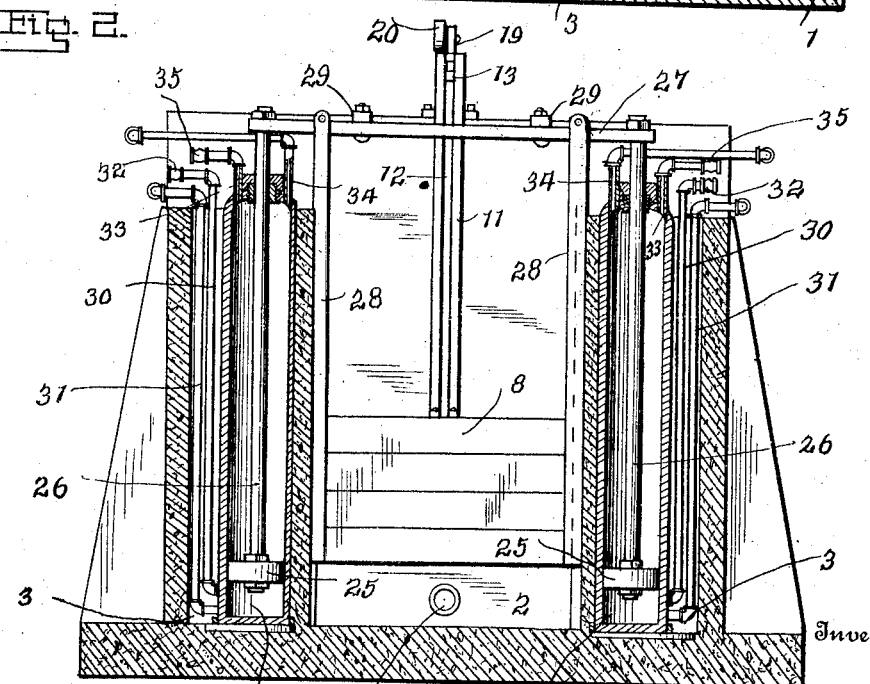
Fig. 3 is a vertical section on the line 3—3 of Fig. 1.

It will be understood that the apparatus may be designed in such proportions that the reciprocation of the plunger may be utilized directly to operate machinery. The device, however, is particularly adapted to create a supply of compressed air for use where and when needed, and I have illustrated means whereby it will be utilized for such purpose. In each of the chambers 3 is located a cylinder 24 which is of air-tight construction and substantial so as to resist high pressure. Fitted in each cylinder 24 is a piston 25 mounted to reciprocate therein and having a piston rod 26 extending through the upper head of the cylinder and secured to a cross bar 27 which is connected firmly with the plunger 8 through a frame consisting of uprights 28 and bracing beams 29. It will be readily noted, upon reference to Figs. 1 and 3, that each cross bar 27 is connected to two piston rods and that the uprights are arranged adjacent the sides of the working chamber 2 so that they may be guided thereby. It will also be noted that all the pistons are operated synchronously and, consequently the conditions in any one cylinder at any time are the same as the working conditions in all the other cylinders. Extending vertically within each chamber 3 are intake pipes 30 and outlet pipes 31 which communicate at their lower ends with the lower ends of the cylinder in the respective chamber. The intake pipe 30 is provided at its upper end above the caisson with an inwardly opening check valve 32 of any known or approved construction whereby air may be drawn in through the said pipe but will be prevented from escaping therefrom and the outlet pipe 31 is extended to any suitable compressed air reservoir (not shown). In the top or upper head of each cylinder 24 are fitted the ends of intake pipes 33 and outlet pipes 34, the intake pipe being equipped with an inwardly opening check valve 35 and the outlet pipe being extended to the compressed air reservoir.

It will now be seen that the pistons 25 through their connections with the plunger 8 move simultaneously in the same direction as the plunger. On the up-stroke, air will be drawn into the cylinders through the pipes 30 and accumulate below the several pistons 25, while any air that may be above the pistons will be driven from the cylinders through the outlet pipes 34. When the travel of the plunger is reversed and it moves downwardly, the travel of all the pistons 25 will likewise be reversed and they will then move downwardly within their respective cylinders so that the air below the several pistons will be compressed and forced out through the outlet pipes 31. This operation will obviously be continued as long as the supply of water is maintained through the main inlet pipe 5, and the supply of compressed air will thus be maintained without requiring the services of a corps of operators and without any special attention. The apparatus is compact and may be installed wherever the flow of water is suitable at a comparatively low initial cost while the cost of maintenance will be negligible.

Having thus described the invention, I claim:

1. In an apparatus for the purpose set forth, the combination of a working chamber, a plunger mounted to reciprocate therein, a water tank arranged adjacent the working chamber, a pipe leading from said tank into the bottom of the working chamber, a valve arranged to seat in the upper end of said pipe to cut off the flow of water therethrough, said valve having a bail rising therefrom through the top of the tank, and means controlled by the plunger and engaging the bail for unseating and seating the said valve whereby to establish or cut off the flow of water to the working chamber for reversing the movement of the plunger.

2. In an apparatus for the purpose set forth, the combination of a working chamber, a plunger mounted for vertical reciprocation in said chamber, a tank adjacent the working chamber, a pipe leading from said tank into the bottom of the working chamber, a valve in the tank arranged to seat in the end of the said pipe and having a bail rising through the top of the tank, a slotted post rising from the plunger, a lever pivoted between its ends and having its ends engaged respectively with the post rising from the plunger and the bail rising from the valve, and a latch mounted above the lever to be rocked thereby and yieldably hold the lever in the position in which it is set by the movement of the plunger.

3. In an apparatus for the purpose set forth, the combination of a working chamber, a plunger mounted in said chamber for vertical reciprocation, means for delivering water in the working chamber below the plunger therein, a valve controlling the flow through said delivering means, and a lever fulcrumed between its ends, one end of the lever projecting over and having a lost-motion connection with the plunger and the other end of the lever having a lost-motion connection with the valve.

In testimony whereof I affix my signature.

CÉLESTIN LECRENIER. [L. S.]